United States Patent  
Campbell et al.

(10) Patent No.: US 9,115,777 B2
(45) Date of Patent: Aug. 25, 2015

(54) SELF-RETRACTING EXTENSION LIMITING DEVICE

(76) Inventors: Richard V. Campbell, Tallahassee, FL (US); David Hilbig, Cairo, GA (US); David Sediles, Tallahassee, FL (US); Kristopher Wortham, Tallahassee, FL (US); Kevin Gomes, Boston, GA (US); Kevin Barefield, Bainbridge, GA (US)

( * ) Notice: Subject to any disclaimer, the term of this patent is extended or adjusted under 35 U.S.C. 154(b) by 2260 days.

(21) Appl. No.: 11/985,088

(22) Filed: Nov. 13, 2007

(65) Prior Publication Data

US 2008/0197548 A1 Aug. 21, 2008

Related U.S. Application Data

(60) Provisional application No. 60/902,283, filed on Feb. 20, 2007.

(51) Int. Cl.
F16F 9/00 (2006.01)
F16F 1/12 (2006.01)
F16F 3/04 (2006.01)

(52) U.S. Cl.
CPC .. F16F 1/128 (2013.01); F16F 3/04 (2013.01)

(58) Field of Classification Search
CPC .................................. F16G 3/04; F16F 1/128
USPC .................. 267/69, 70–74; 114/219, 230.15, 114/230.17, 230.18; 296/107.12, 100.15; 119/770, 794, 796; 405/214; 188/379, 188/380
See application file for complete search history.

(56) References Cited

U.S. PATENT DOCUMENTS

| 1,621,809 | A | * | 3/1927 | Petersen | 114/230.24 |
| 2,117,701 | A | * | 5/1938 | Burnett | 267/72 |
| 4,472,183 | A | * | 9/1984 | Mace | 55/378 |
| 4,627,375 | A | * | 12/1986 | Davis et al. | 114/230.18 |
| 4,681,303 | A | * | 7/1987 | Grassano | 267/113 |
| 5,307,753 | A | * | 5/1994 | Besonen et al. | 114/230.18 |
| 5,482,258 | A | * | 1/1996 | Clauson et al. | 267/71 |
| 5,524,566 | A | * | 6/1996 | Rapa et al. | 114/230.22 |
| 5,721,393 | A | * | 2/1998 | Richardson, Jr. | 174/42 |
| 5,832,861 | A | * | 11/1998 | Taylor | 114/230.26 |
| 6,098,970 | A | * | 8/2000 | Lowe | 267/179 |
| 6,158,374 | A | * | 12/2000 | Free, Jr. | 114/215 |
| 6,345,583 | B1 | * | 2/2002 | Thackston et al. | 114/213 |

* cited by examiner

Primary Examiner — Thomas J William
Assistant Examiner — Mariano Sy
(74) Attorney, Agent, or Firm — J. Wiley Horton

(57) ABSTRACT

A self-retracting extension limiting device. It is designed to be attached between a first object and a second object, where the distance between the first and second objects is variable. The device exerts a restoring force tending to draw the two objects together. A first, relatively weak restoring force is exerted over a range of distance. Then, when the objects have been separated to a defined limit of travel, the device exerts a much greater restoring force. The invention includes overlapping and self-contained elements so that unwanted slack is minimized.

12 Claims, 25 Drawing Sheets

SELF-RETRACTING EXTENSION LIMITING DEVICE

CROSS-REFERENCES TO RELATED APPLICATIONS

THIS APPLICATION CLAIMS THE BENEFIT OF AN EARLIER-FILED PROVISIONAL APPLICATION HAVING SERIAL No. 60/902,283, filed Feb. 20, 2007.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of rigging. More specifically, the invention comprises an extendable motion-limiting device that has an integral retracting and aligning feature.

2. Description of the Related Art

Rigging devices are used to link one object to another. In many applications, this link must be able to accommodate a varying distance between the two objects. One example is the stabilization of a floating dock, where the water level varies over a significant range. A cable securing such a dock must restrain the dock, yet also extend and retract to allow tidal variations.

FIG. 1 shows a prior art check cable 14 connected between first block 10 and second block 12. Throughout this disclosure, the reader should bear in mind that the term "cable" is intended to encompass any tensile member, and could include fiber ropes, synthetic cables, chains, wire ropes, straps, and similar items. In some applications, the cable could even be a rigid rod.

The check cable is attached to the blocks by any convenient method. The actual method of attachment is not significant to the present invention. Thus, the attachment means could include tying, embedding, potting, swaging, and many other known approaches.

The reader will observe that check cable 14 is slack in FIG. 1. It has deflected downward under the influence of gravity. Slack in a stabilizing line often presents a problem. In the case of a floating dock, the slack can become entangled in other structures or moving watercraft. Thus, it is customary to add features which control the slack.

FIG. 2 shows a check cable 14 incorporating a spring 16 connected to attachment point 18. If first block 10 and second block 12 are moved closer together, spring 16 takes the slack out of the cable by creating slack portion 20. Relative motion between the first and second blocks is thereby governed by two distinct phenomena. As the blocks move further apart from the position shown in FIG. 2, spring 16 will expand and slack portion 20 will become more horizontal. When all the slack is removed from slack portion 20 the check cable will draw taut. The check cable is preferably made of a material having a much higher linear extension coefficient than spring 16. Thus, as the blocks move away from each other, there will be a first range of distance where the force tending to pull the blocks together (a "restoring force") grows linearly. Then, when the check cable grows taut, the restoring force tending to pull the blocks together will suddenly grow much greater. This combination of force is advantageous in many circumstances.

Of course, there are many known devices for producing such a combination of forces. FIG. 3 shows one such arrangement. The near end of check cable 14 is directly connected to first block 10. The far end is rolled around retracting drum 22, which is attached to second block 12. The retracting drum is biased by a spring so that it tends to "reel in" the free cable. The spring can be a conventional one, so that the restoring force increases as the blocks are moved further apart. On the other hand, a constant force spring can be used in the drum so that the restoring force is constant on the check cable. The end of check cable 14 is solidly connected to the drum so that once a defined extension limit is reached, the check cable draws taut and restricts further motion between the blocks.

FIG. 4 shows another variation on this concept. Planar spring 24 is made of a material which can elastically deform to a state where it is completely straight. The dual extension behavior is thereby realized. A relatively weak restoring force is present at first. This builds steadily until the planar spring is completely straightened, at which point the restoring force rises dramatically.

A parallel arrangement of two dissimilar materials is shown in FIG. 5. Elastic member 26 is an expandable elastic material (such as a piece of natural or synthetic rubber). Check cable 14 is wrapped around elastic member 26. Though the check cable has the appearance of a helical spring, it does not act as a spring. The assembly expands until check cable 14 draws taut, at which point further expansion is restricted. The reader will therefore appreciate that extension limiting devices having changing restoring force characteristics are useful in many applications.

BRIEF SUMMARY OF THE PRESENT INVENTION

The present invention comprises a self-retracting extension limiting device. It is designed to be attached between a first object and a second object, where the distance between the first and second objects is variable. The device exerts a restoring force tending to draw the two objects together. A first, relatively weak restoring force is exerted over a range of distance. Then, when the objects have been separated to a defined limit of travel, the device exerts a much greater restoring force. The invention includes overlapping and self-contained elements so that unwanted slack is minimized and alignment of the elements is maintained.

REFERENCE NUMERALS IN THE DRAWINGS

| 10 | first block | 12 | second block |
|---|---|---|---|
| 14 | check cable | 16 | spring |
| 18 | attachment point | 20 | slack portion |
| 22 | retracting drum | 24 | planar spring |
| 26 | elastic member | 27 | compressive element |
| 28 | first cable loop | | |
| 30 | second cable loop | 32 | interlock |
| 34 | tension spring | 36 | loop apex |
| 38 | first sling loop | 40 | second sling loop |
| 42 | pulley | 44 | coupling device |
| 46 | termination | 48 | first loop cable |
| 50 | second loop cable | 52 | first apex block |
| 54 | second apex block | 56 | cable strands |
| 58 | potted region | 59 | expanding passage |
| 60 | spring anchor | 62 | stabilizing first apex block |
| 64 | stabilizing second apex block | | |
| 66 | cable guide bore | 68 | anchor access port |
| 70 | anchor bulkhead | 72 | cable exit |
| 74 | anchor | 80 | second offset block |
| 82 | first offset block | 84 | second dogleg block |
| 86 | first dogleg block | 90 | first loop end block |
| 92 | second loop end block | 94 | extension limiting device |
| 96 | first cable | 98 | second cable |
| 100 | loop apex block | 102 | loop retainer |
| 104 | loop access port | 106 | anchor block |
| 108 | elastic tensile member | | |

DETAILED DESCRIPTION OF THE INVENTION

Figure 1:
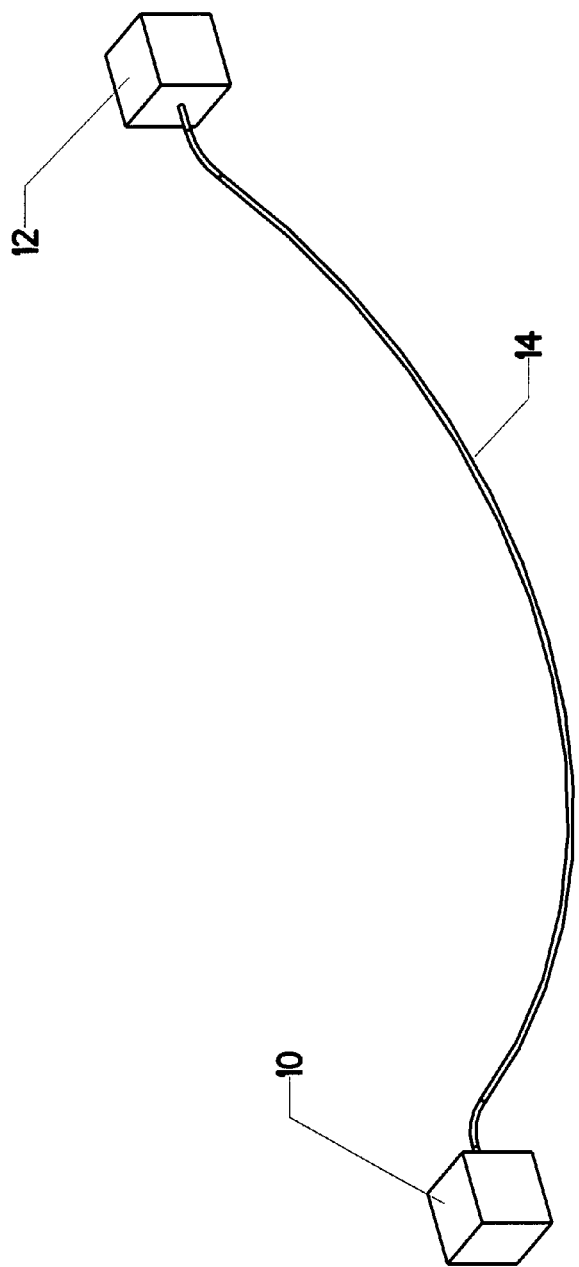
FIG. 1 is a perspective view, showing a prior art check cable.
Figure 2:
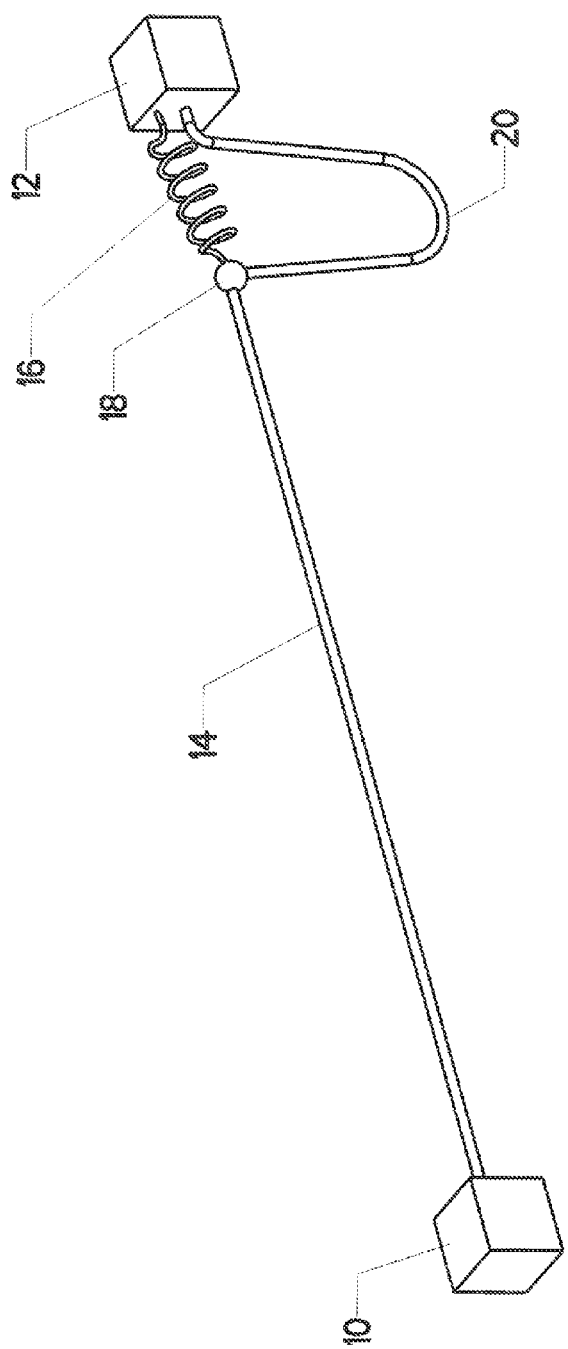
FIG. 2 is a perspective view, showing a prior art check cable with a slack-eliminating feature.
Figure 3:
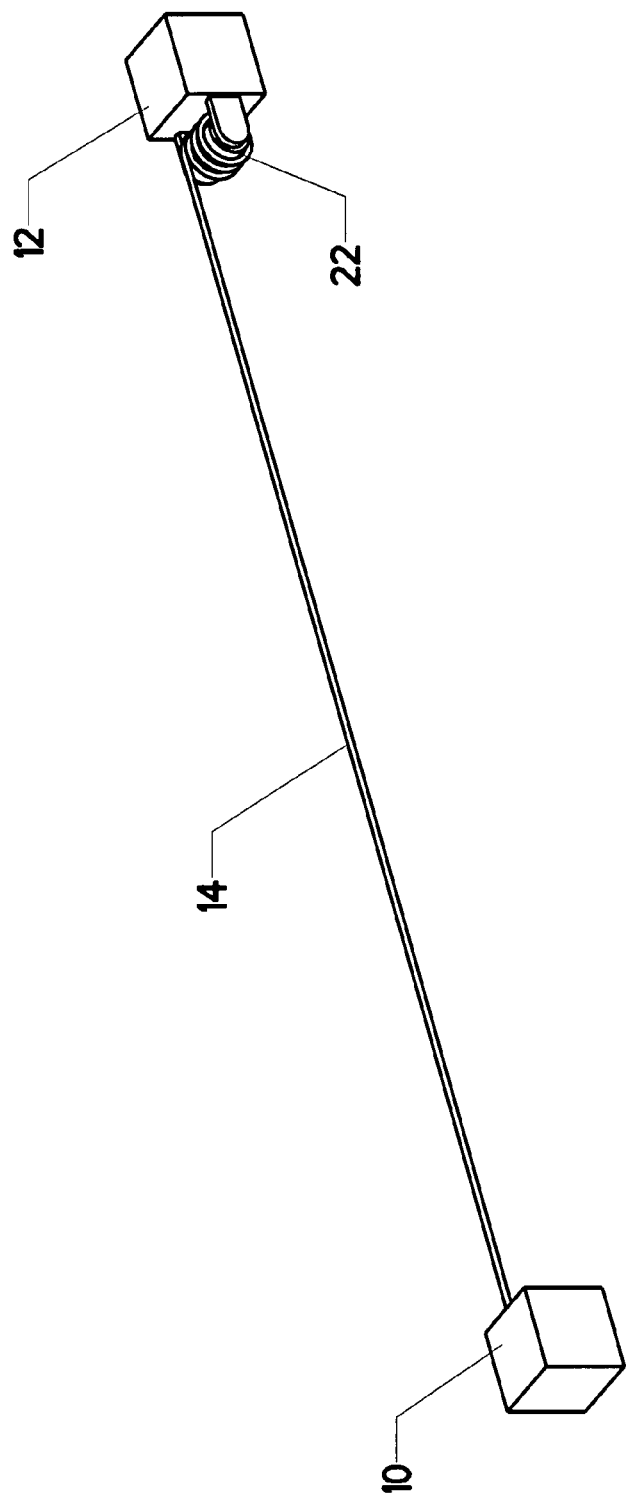
FIG. 3 is a perspective view, showing a different type of slack-eliminating feature.
Figure 4:
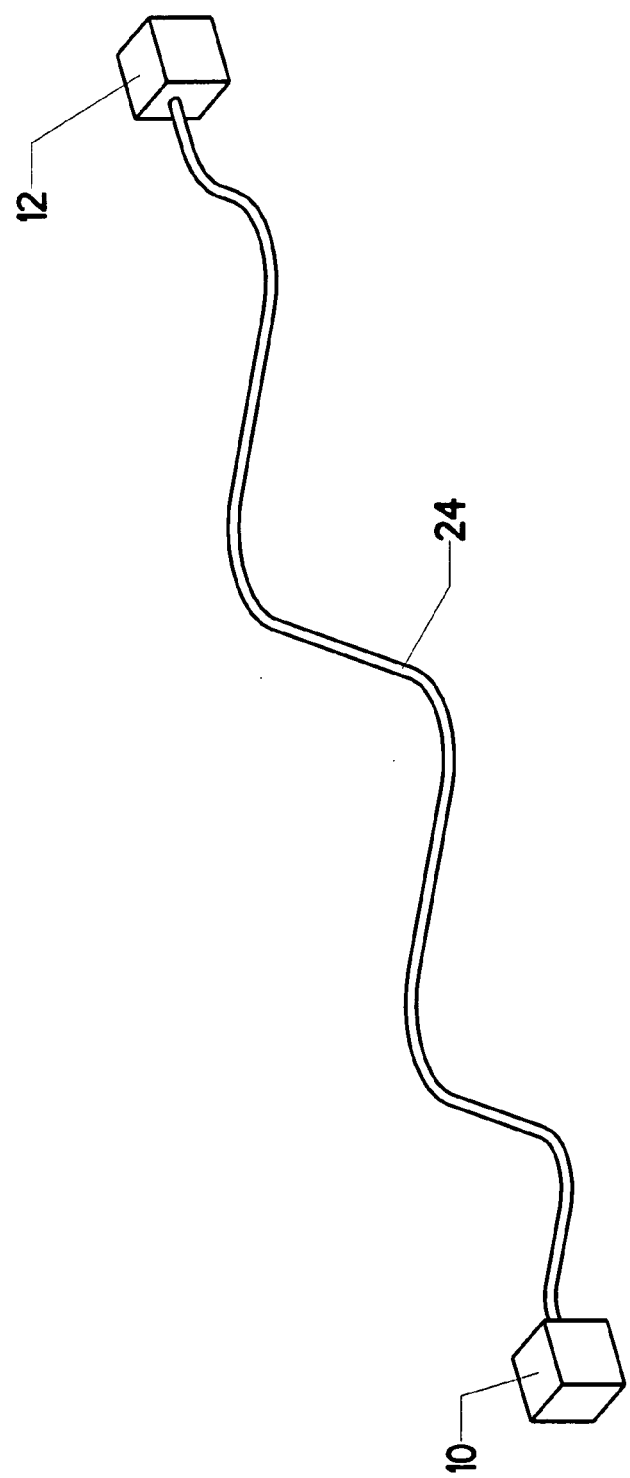
FIG. 4 is a perspective view, showing the use of a planar spring to create a staged restoring force.
Figure 5:
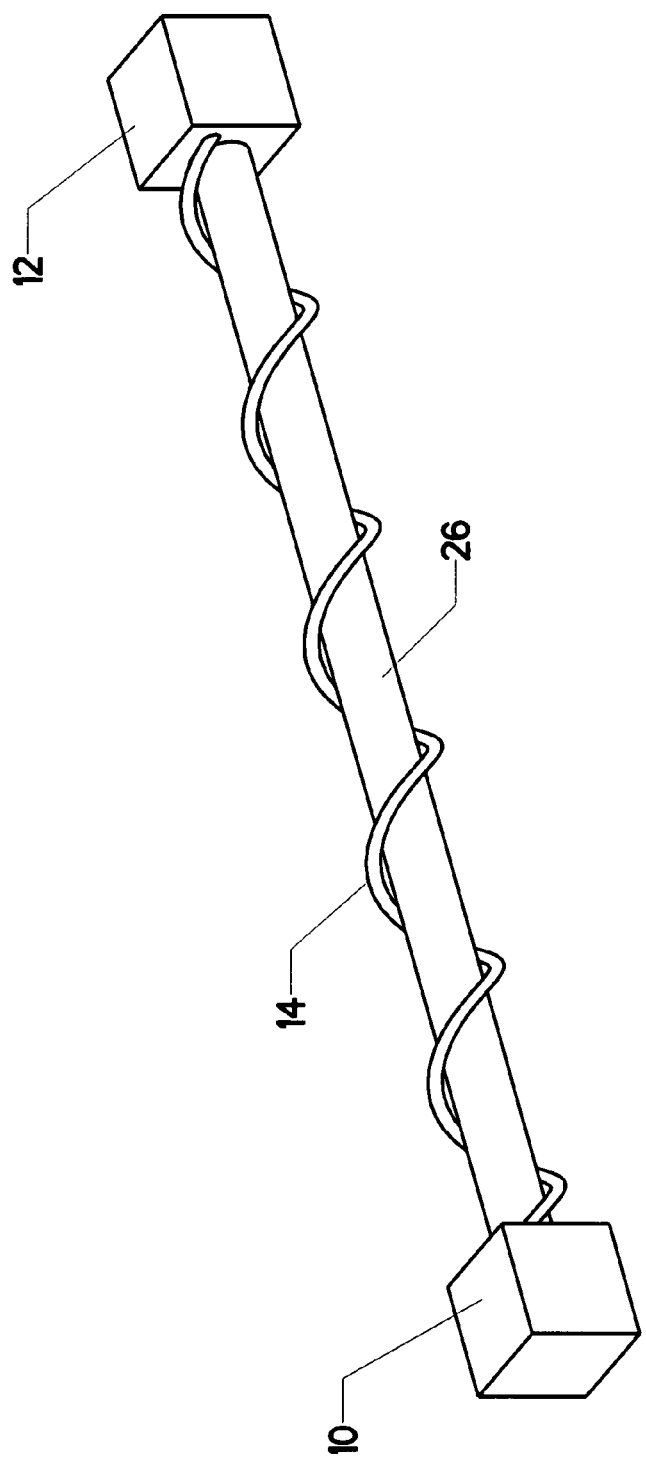
FIG. 5 is a perspective view, showing the use of two parallel elements to create a staged restoring force.
Figure 6:
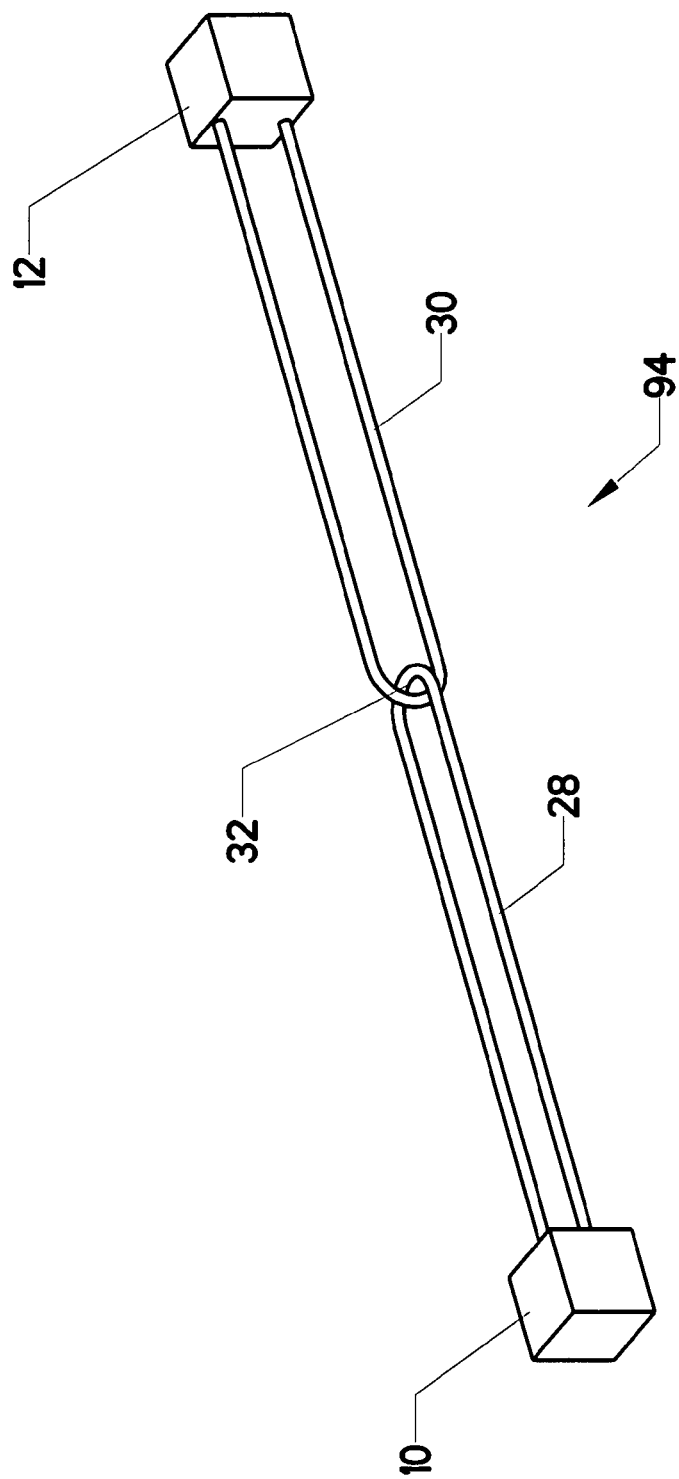
FIG. 6 is a perspective view, showing a portion of the present invention.

FIG. 6 shows the primary components of the present invention (designated as extension limiting device 94). A connection is made between first block 10 and second block 12. The blocks represent any two items that are to be attached (such as a ship and a mooring point). The connection is made by creating an interlock 32 between first cable loop 28 and second cable loop 30. The two free ends of cable loop 30 are attached to second block 12. Likewise, the two free ends of cable loop 28 are attached to first block 10.

First block 10 and first cable loop 28 thereby form a first loop which moves in unison. Second block 12 and second cable loop 30 form a second loop which likewise moves in unison. The reader will observe in this disclosure how the two loops can be formed with various components and means of connection. However, the concept of the elements within a loop moving in unison remains throughout. The two loops shown in FIG. 6 are angularly offset (in this case by 90 degrees) to form the interlock. The arrangement shown limits how far apart the two blocks can travel. When the two cable loops draw taut, interlock 32 will prevent further travel.

Figure 7:
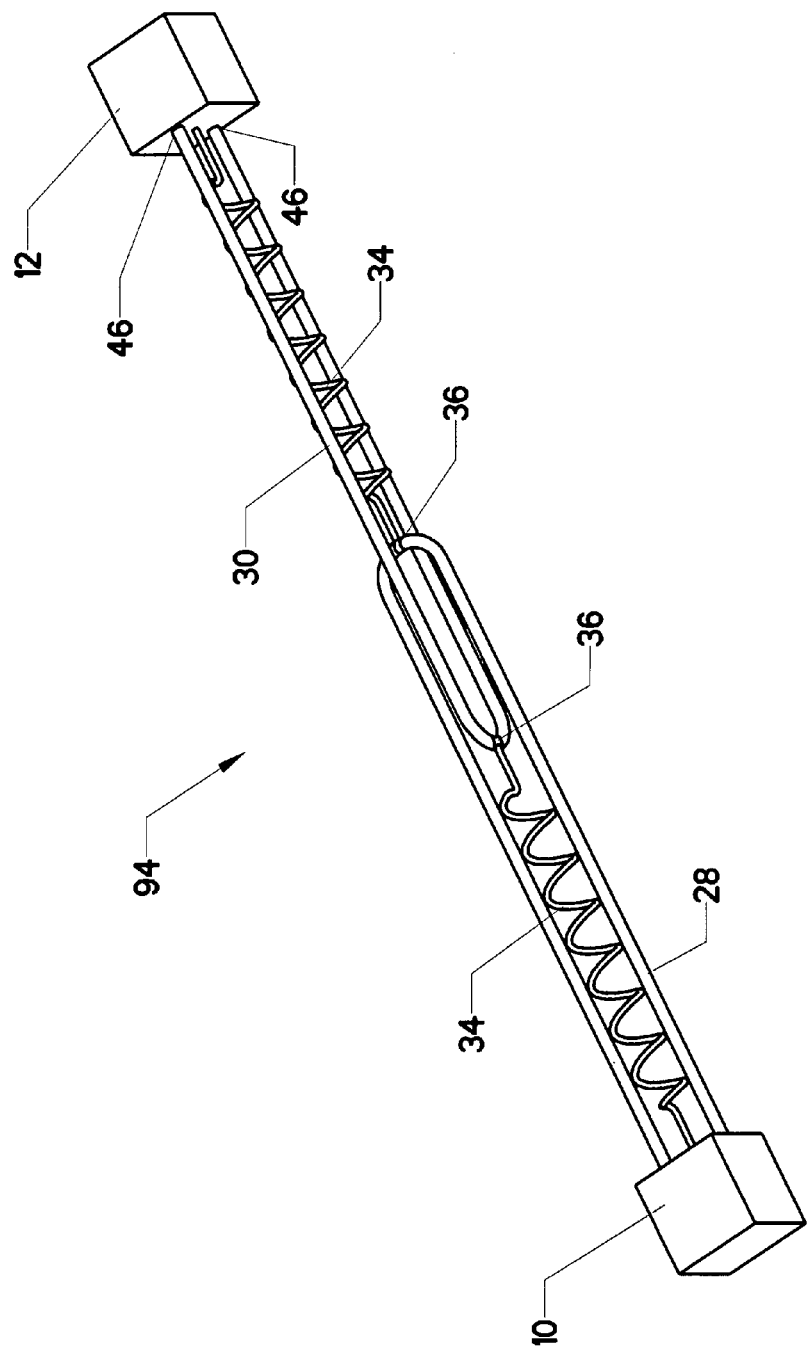
FIG. 7 is a perspective view, showing the addition of tension springs to the present invention.

The device of FIG. 6 lacks features to take up slack in the assembly. FIG. 7 shows these features. Each cable loop has a loop apex 36. A tension spring 34 is attached between each loop apex and the opposite block, as shown (Although coil springs are shown in FIG. 7, any type of elastically expanding tensile member could be used).

The tension springs maintain tension on the cable loops, even as the two blocks are moved closer together. The result is a staged restoring force between the two blocks. In the position shown in FIG. 7, the restoring force is created by the extension of the two tension springs 34. The restoring force will increase linearly as the two blocks are pulled away from each other. However, at some point the two loop apexes will collide to form interlock 32. Once this occurs, the cables will draw taut and the restoring force will substantially increase (assuming that the cables are made of a relatively inelastic material).

Figure 8:
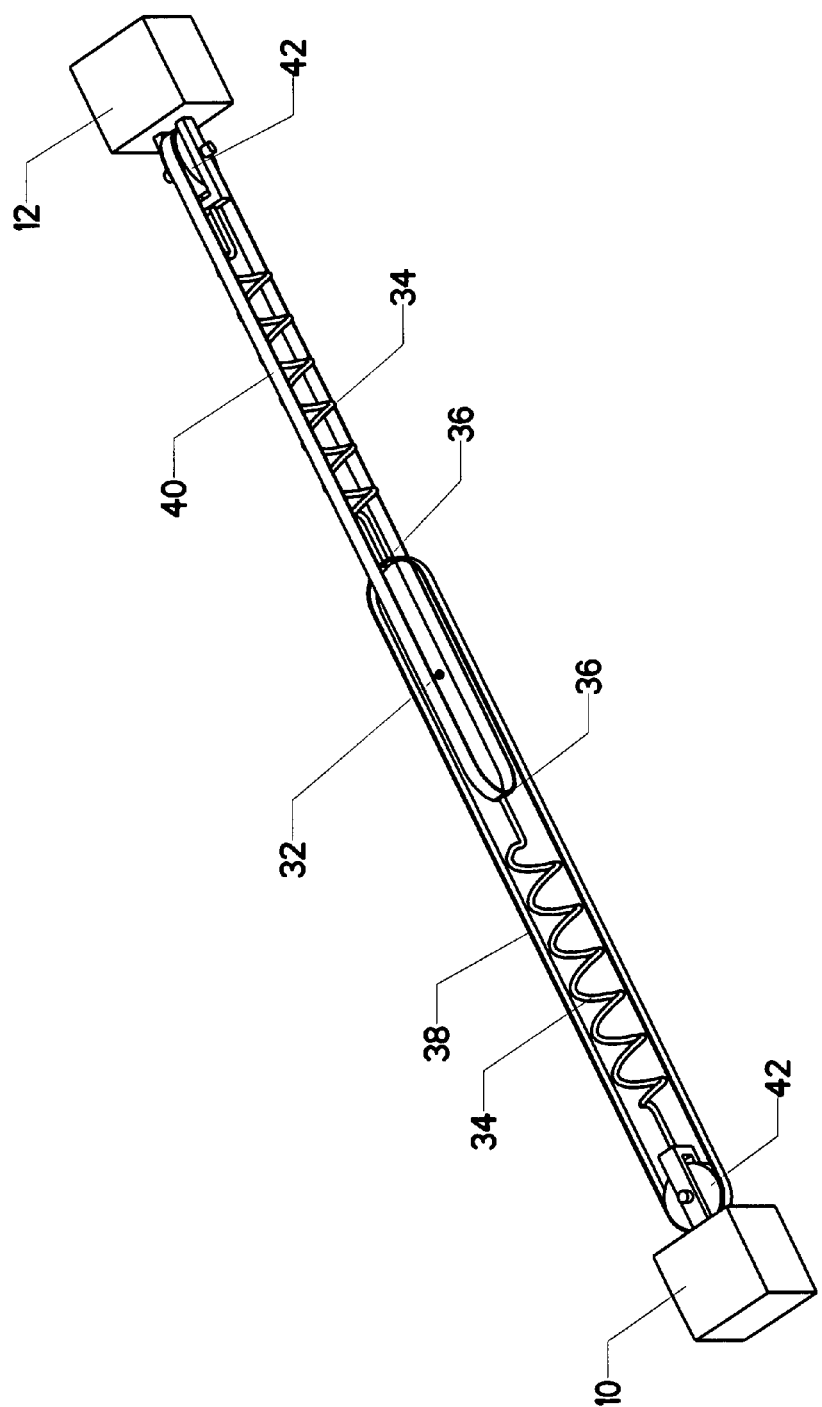
FIG. 8 is a perspective view, showing an alternate embodiment of the present invention using sling loops.

FIG. 8 shows the same type of assembly using slings instead of conventional round cables. Interlock 32 is created by the overlap between first sling loop 38 and second sling loop 40. The tension springs are connected between each block and its opposing loop apex, as for the embodiment of FIG. 7.

Figure 9:
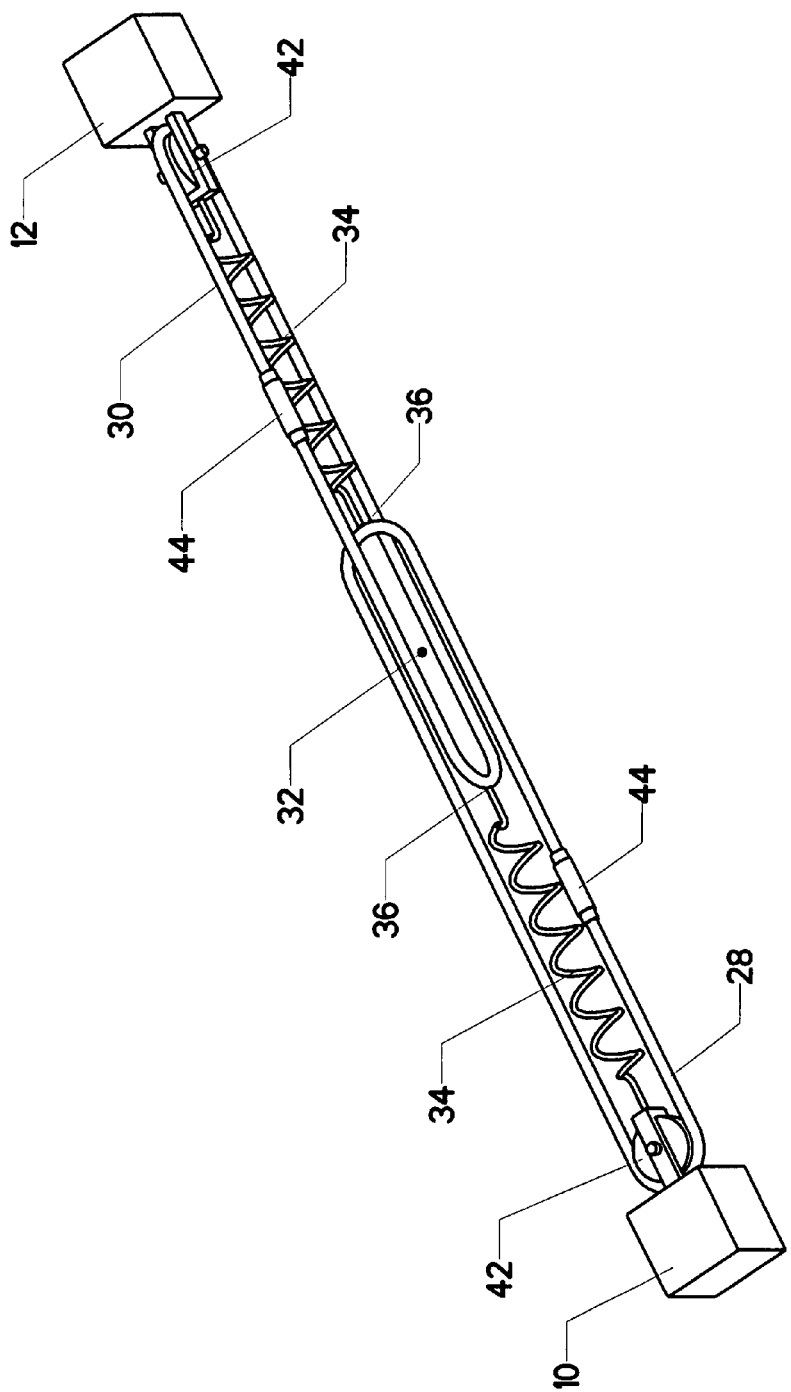
FIG. 9 is a perspective view, showing an alternate embodiment of the present invention where each loop is created by coupling one end of a cable to its opposite end.

FIG. 9 shows a different method of attaching the cable loops to the blocks. Instead of attaching each loop's free ends to the blocks, the free ends are joined by coupling devices 44. Thus, each cable loop is a complete oval. A portion of each oval is passed around a pulley 42. The two pulleys 42 are connected to the blocks by rotary joints. Tension springs 34 are again placed between the loop apexes and the appropriate block.

While the devices shown in FIGS. 6-9 are functional, those skilled in the art will realize that attaching one end of a tension spring to a loop apex presents practical problems. The cables used in the loops will often be flexible. Simply hooking one end of a spring around the apex will greatly stress the cable at that one point. Another component is preferably employed to eliminate this problem.

Figure 10:
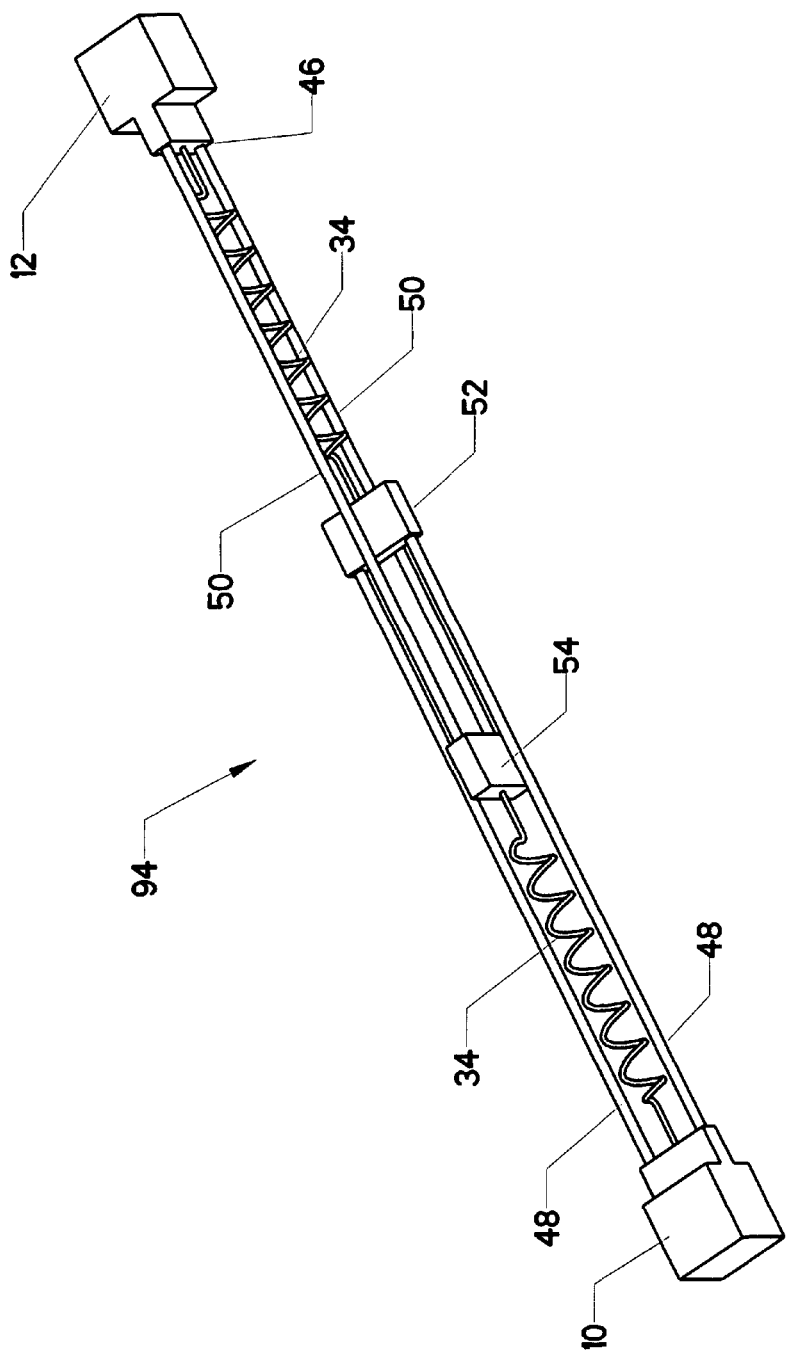
FIG. 10 is a perspective view, showing a version of the present invention using apex blocks.

FIG. 10 shows this additional component. First apex block 52 and second apex block 54 are placed in the position of the loop apexes shown in FIG. 9. Tension springs 34 connect to these apex blocks rather than to the cables themselves. First block 10 is connected to first apex block 52 by a pair of first loop cables 48 (The combination of the pair of first loop cables 48, first apex block 52, and first block 10 forming a loop). Likewise, second apex block 54 is connected to second block 12 by a pair of second loop cables 50. The cable ends are attached to the apex blocks using any known method.

Figure 11:
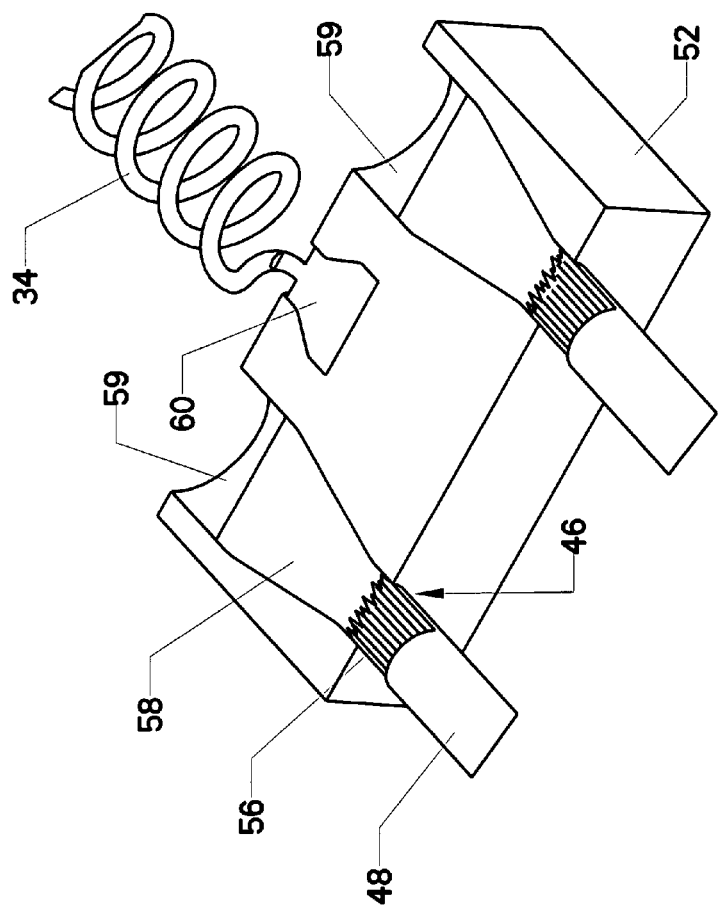
FIG. 11 is a perspective view with a cutaway, showing the internal details of an apex block.

FIG. 11 illustrates one approach to attaching the cables and tension springs to an apex block. First apex block 52 is shown sectioned in half to reveal its internal features. It includes two expanding passages 59. The free ends of the two first loop cables 48 are placed within the two expanding passages. The strands comprising the cable are then splayed and infused with liquid potting compound. At some point prior to the hardening of the liquid potting compound, the cable ends are placed within expanding passages 59. The liquid potting compound then transitions to a solid, creating potted region 58. Each potted region 58 contains a solidified composite of cable strands and hardened potting compound. This then creates a mechanical interference with the expanding passage in first apex block 52, thereby locking the cable to the first apex block. The completed interlock is referred to as termination 46.

Tension spring 34 may likewise be attached to the apex block by a variety of methods. One approach is to form spring anchor 60 on the end of the spring (using a forging or heading process) then cast the first apex block around spring anchor 60. Another approach would simply be to provide an eye on the portion of first apex block 52 facing the tension spring. A hook on one end of the spring could then be inserted through this eye.

Returning to FIG. 10, the reader will observe how the use of the apex blocks allows a better connection between the cables within a loop and the corresponding tension spring. Within the invention's prescribed range of motion, the distance between a block and its corresponding apex block will remain constant. First block 10 and first apex block 52 will remain separated by a fixed distance, even as the distance between first block 10 and second block 12 varies. Likewise, second block 12 and second apex block 54 will remain separated by a fixed distance.

The two tension springs 34 maintain tension within the two "loops," so that the cables remain taut and aligned. The tension within the springs also tends to contract the overall length of the device (Second block 12 is urged toward first block 10). The springs provide a restoring force. This is important even where rigid materials are used for the cables. As an example, the cables could be made of stiff fiberglass. Such cables would remain straight even without tension springs 34. However, as explained initially, an important feature of the invention is the provision of a staged restoring force. Tension springs 34 provide the first stage of the restoring force. If, as an example, extension limiting device 94 is connected between a corner of a floating dock and a fixed point on shore, the tension springs will tend to urge the dock toward the fixed point on shore. The first stage of the restoring force may be quite weak in some applications. In fact, in some cases only enough restoring force to retain the general alignment of the components will be needed.

In the case of a floating dock, wave and possibly tidal action will tend to extend and retract extension limiting device 94. Those skilled in the art will also realize that lateral flexing motions will occur. The geometry used in the embodiment of FIG. 10 has some disadvantages, in that the two apex blocks can be pushed laterally into the cables. This action can cause wear. Thus, additional features are desirable.

Figure 12:
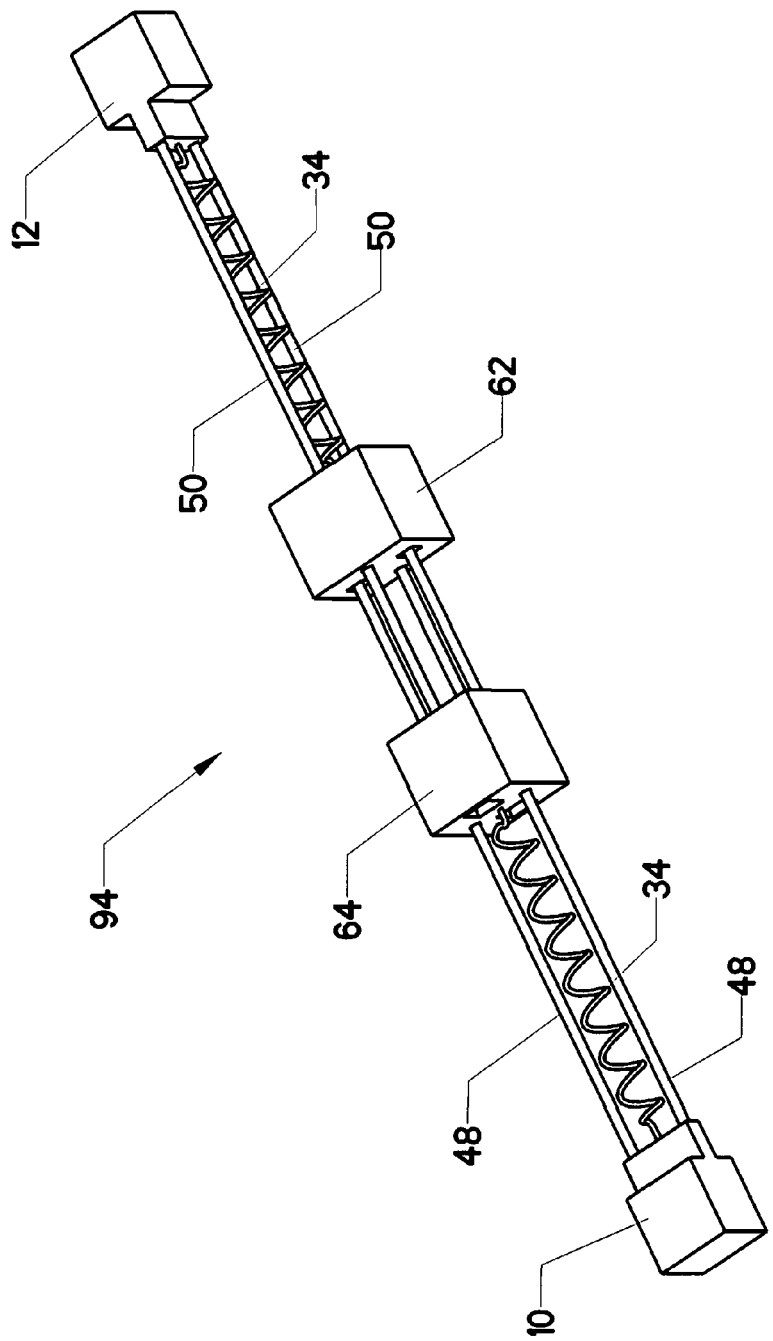
FIG. 12 is a perspective view, showing the use of apex blocks incorporating stabilizing bores.

FIG. 12 shows another embodiment of extension limiting device 94. In this embodiment, stabilizing apex blocks are used. Stabilizing first apex block 62 is connected to a pair of first loop cables 48. However, it also contains a pair of passages that allow the two second loop cables 50 to pass through it. These passages are a loose sliding fit, so that stabilizing first apex block 62 can slide back and forth along second loop cables 50.

Stabilizing second apex block 64 is attached to the two second loop cables 50. It includes passages allowing it to accommodate and slide back and forth along the two first loop cables 48. The use of the stabilizing apex blocks keeps all the components appropriately separated as the extension limiting device expands and contracts, thereby reducing wear.

Figure 13A:
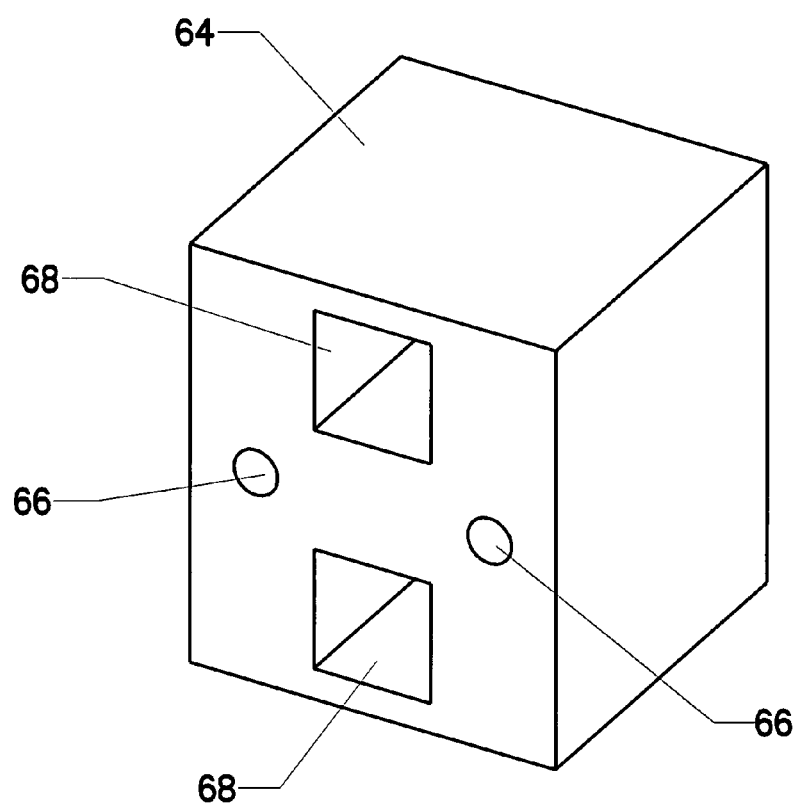
FIG. 13A is a perspective view, showing one type of apex block in more detail.
Figure 13B:
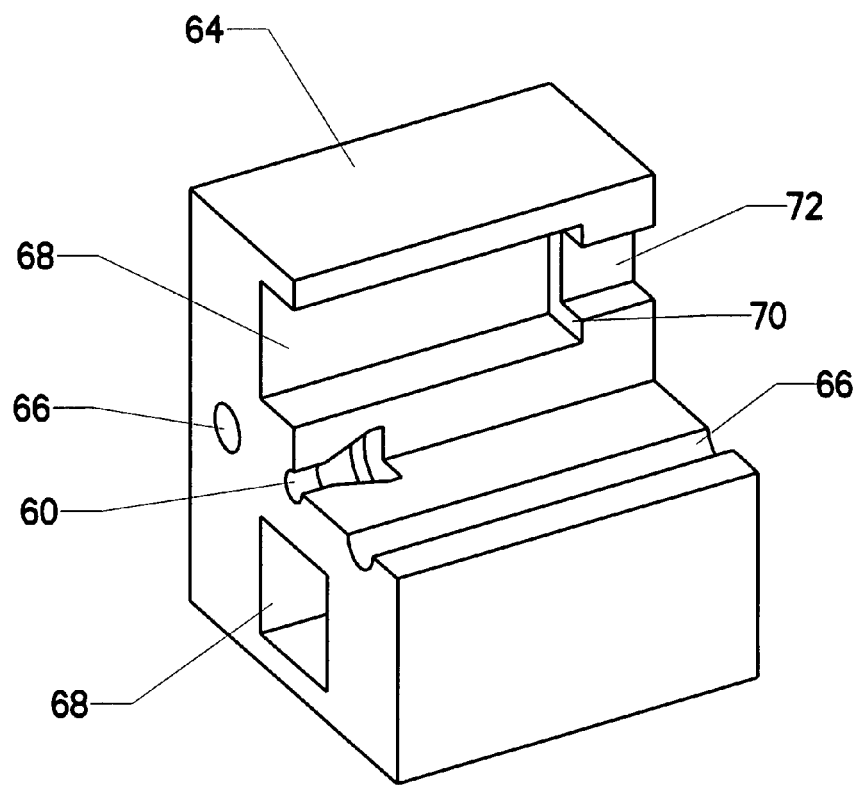
FIG. 13B is a perspective view with a cutaway, showing internal features of the apex block shown in FIG. 13A.

FIG. 13A shows stabilizing second apex block 64. It includes two cable guide bores 66, which pass completely through the block. These are sized to provide a loose sliding fit with first loop cables 48 (thereby stabilizing the motion of the two loops with respect to each other). Two anchor access ports 68 are also provided. FIG. 13B shows the same apex block with a cutaway positioned to reveal internal details. The reader may readily observe how the nearer of the two cable guide bores 66 passes through the block from one side to the other. The reader may also observe the location of spring anchor 60. As for the previous embodiments, the spring could be attached using many different methods, including the provision of an eye or hook on the block.

The two anchor access ports 68 do not pass all the way through the apex block. Anchor bulkhead 70 blocks the far end of each anchor access port. A cable exit 72 passes through each anchor bulkhead. This configuration allows the attachment of stabilizing second apex block 64 to cables having anchors affixed to their free ends.

Figure 14:
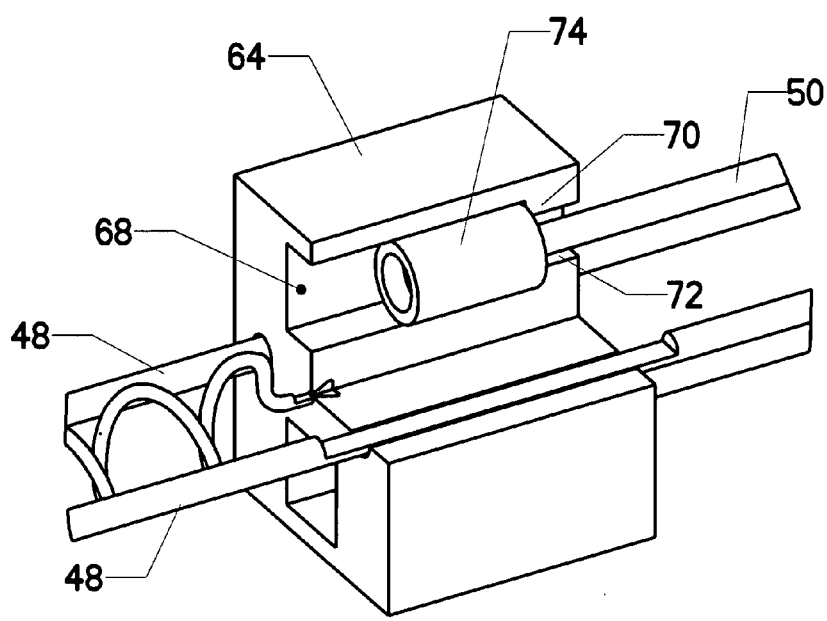
FIG. 14 is a perspective view with a cutaway, showing how the cables are attached to the apex block of FIG. 13A.

FIG. 14 shows stabilizing second apex block 64 with cables attached. The upper of the two second loop cables 50 is shown passing through cable exit 72. Anchor 74—which is securely attached to the end of the cable, bears against anchor bulkhead 70. Cable exit 72 is large enough to allow the passage of the cable, but not the anchor. The anchor can be attached to the end of the cable by any suitable means, including mechanical fasteners, swaging, potting, etc. While a discussion of these techniques is beyond the scope of this disclosure, the reader may learn more about such anchors by reviewing U.S. Pat. No. 7,076,853 to Campbell (2006), which is incorporated herein by reference.

FIG. 14 shows how each of the two second loops cables 50 is attached to the apex block, while each of the two first loop cables 48 pass through the apex block. The approach of using anchors on the end of the cable is suitable for transmitting tensile loads. The use of anchors (as opposed to directly potting the cable ends into the apex block) also allows the device to be more easily assembled in the field. The cables can be passed through the two cable exits 72 before the anchors are added to establish the desired cable length.

Figure 15:
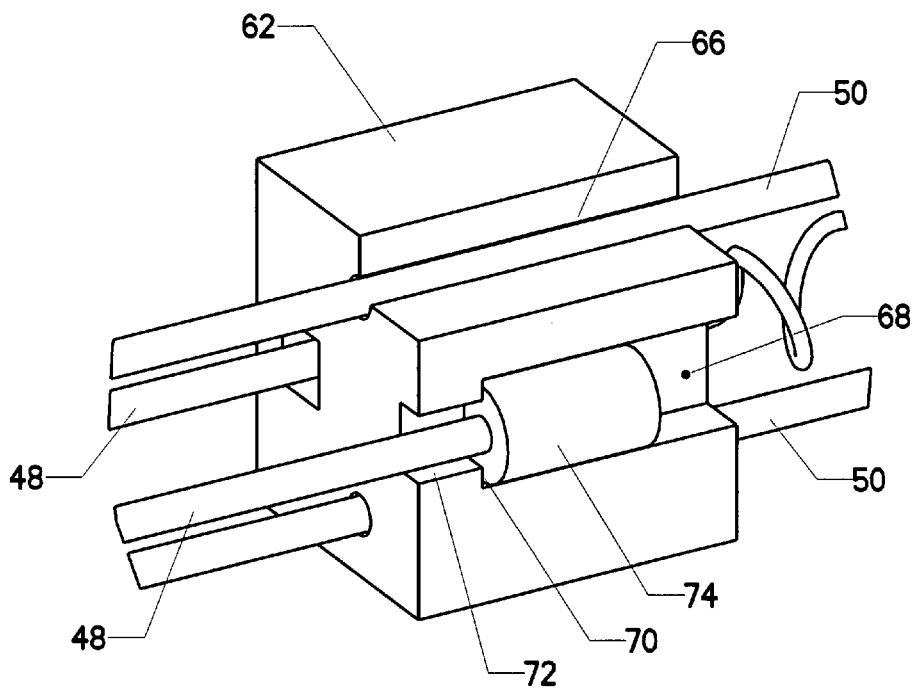
FIG. 15 is a perspective view with a cutaway, showing a different type of apex block.

Referring back to FIG. 12, the reader will recall that the two cable loops are rotationally offset to avoid mechanical interference between the loops. An offset of only a few degrees may be suitable in some circumstances. However, in the embodiment of FIG. 12, the offset is 90 degrees. The same 90 degree offset is used for the illustrated embodiments of the stabilizing apex blocks. FIG. 15 shows stabilizing first apex block 62. The reader will observe that this includes the same features as stabilizing second apex block 64. The stabilizing first apex block is simply the stabilizing second apex block turned around to face the other direction, then rotated 90 degrees.

Stabilizing first apex block 62 includes two cable guide bores 66. These form a loose sliding fit over the two second loop cables 50. The two first loop cables 48 are attached by passing the cables through cable exits 72 and securing the two anchors 74 against anchor bulkheads 70. Thus attached, the invention is able to extend and retract while keeping its components properly aligned.

Figure 16:
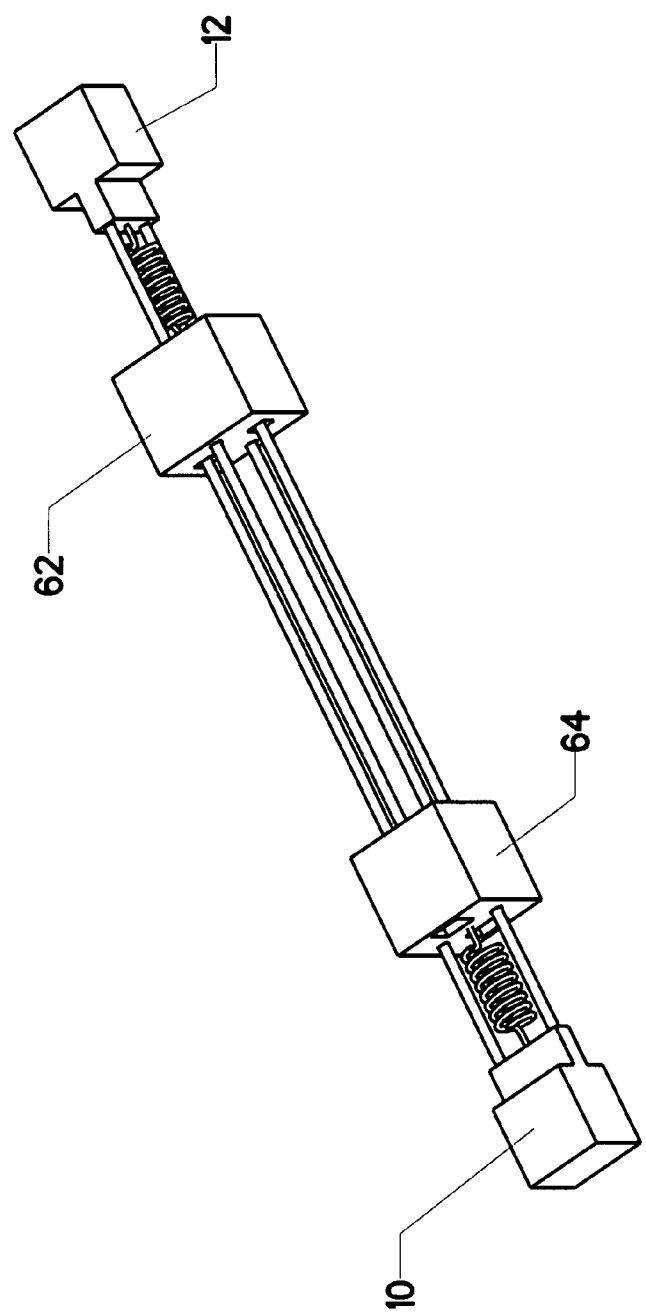
FIG. 16 is a perspective view, showing the present invention in a retracted state.
Figure 17:
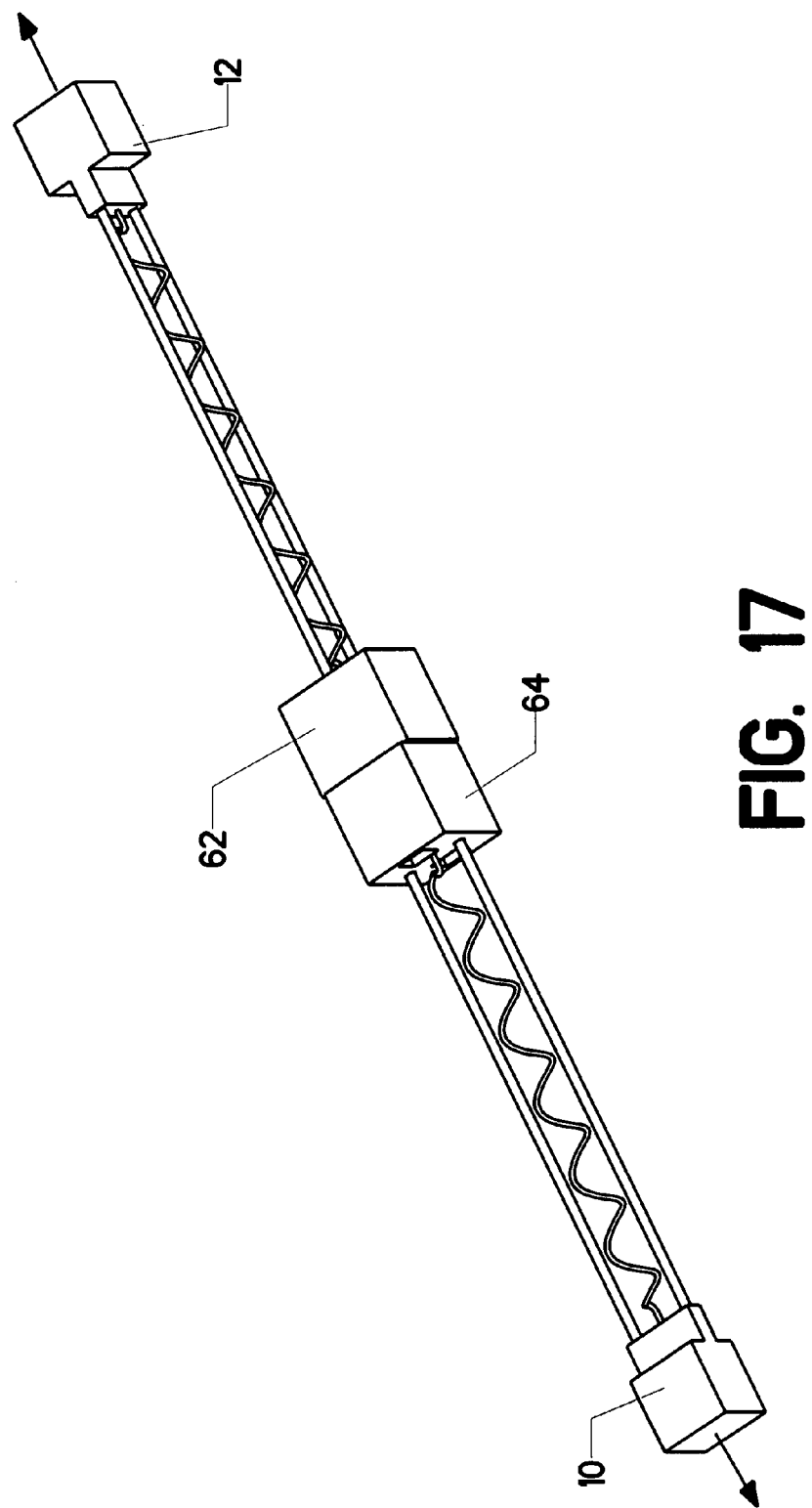
FIG. 17 is a perspective view, showing the present invention in an extended state.

FIGS. 16 and 17 show the invention in a retracted and extended state respectively. In FIG. 16, the two tension springs 34 are in a relaxed state. Thus, there is no restoring force tending to urge second block 12 toward first block 10. As second block 12 is initially moved further away from the position shown in FIG. 16, the tension springs will extend and the restoring force will increase linearly (according to the spring coefficients used). This linear increase is the first stage in the restoring force.

The linear increase in the restoring force will continue until the position shown in FIG. 17 is reached. In this position, stabilizing second apex block 64 is bearing against stabilizing first apex block 62. If additional force tending to pull second block 12 away from first block 10 is then applied, this force will be counteracted by tension in the cables themselves. This phenomenon creates the second stage in the restoring force. The cables—unless very elastic materials are used—will create a much larger restoring force than the tension springs.

The nature of the two stages can be adjusted as desired, by selecting appropriate materials and dimensions for the tension springs and the cables comprising the loops. In most applications there will be a significant rise in the restoring force during the transition from the first stage to the second stage. However, this need not always be the case. For example, a particular application might call for the use of very stiff tension springs and relatively elastic cables. With this arrangement, the transition from one stage to the next would be more gradual.

Figure 18:
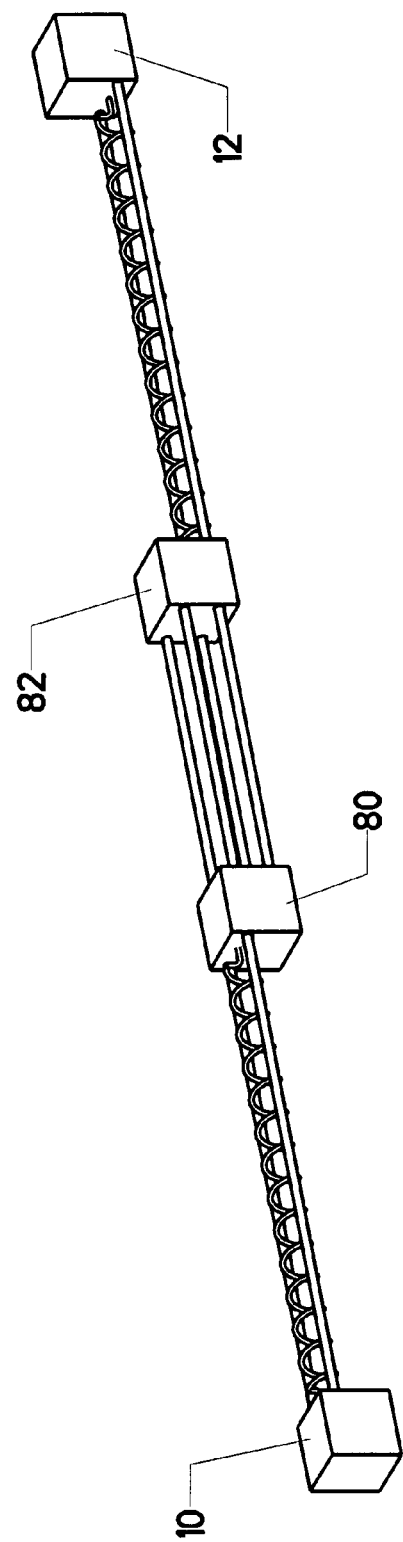
FIG. 18 is a perspective view, showing the use of offset apex blocks.

Those skilled in the art will realize that the arrangements shown in FIGS. 6 through 17 could be realized using a variety of different geometries. FIGS. 16 and 17 use cable loops which are angularly offset by 90 degrees. FIG. 18 shows an embodiment using parallel loops which are linearly offset. First offset block 82 moves in unison with first block 10, whereas second offset block 80 moves in unison with second block 12. Each offset block attaches a pair of cables in one loop, and slidably fits over a pair of cables in the other loop. This type of arrangement has some disadvantages, in that tension on the offset blocks can produce a twisting force. This is a relatively small force, however, which is acceptable in some applications.

Figure 19:
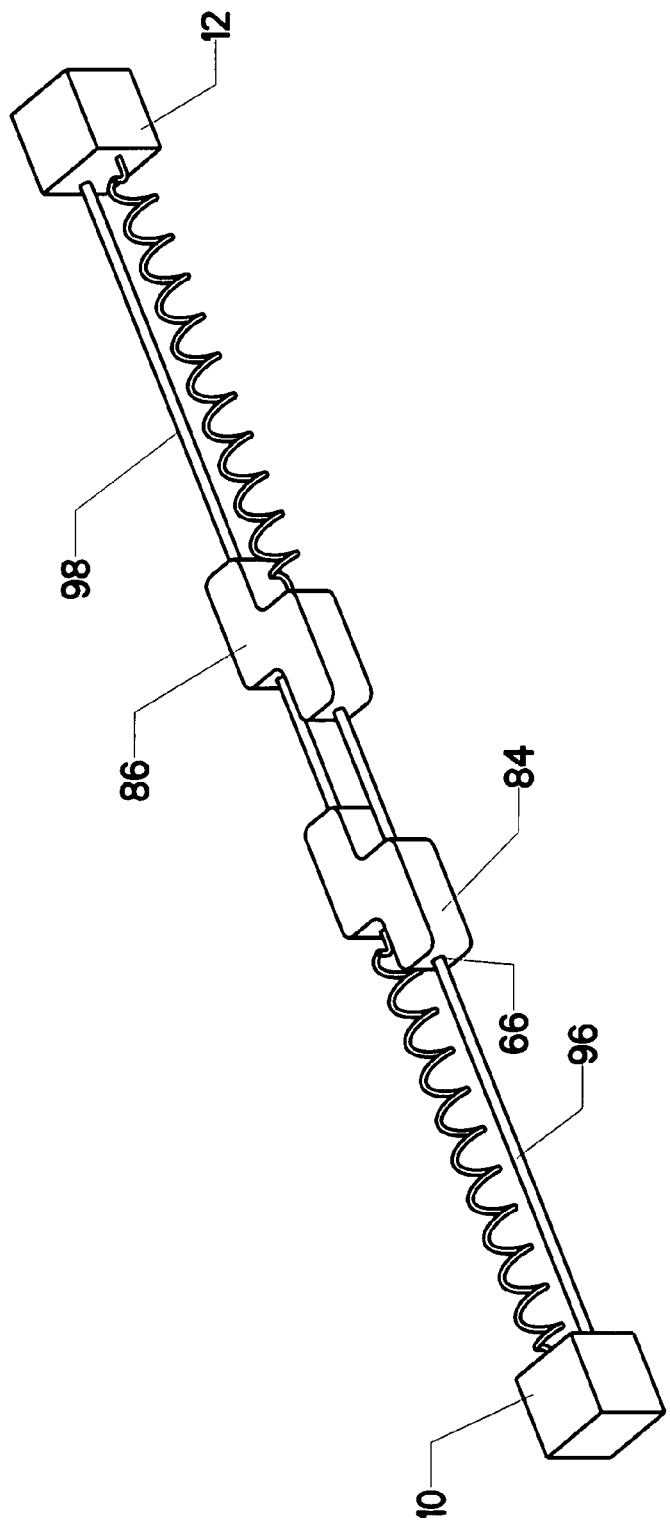
FIG. 19 is a perspective view, showing the use of dogleg apex blocks.

FIG. 19 shows still another geometry, using first dogleg block 86 and second dogleg block 84. First dogleg block 86 moves in unison with first block 10, whereas second dogleg block 84 moves in unison with second block 12. First cable 96 passes through second dogleg block 84 and attaches to first dogleg block 86. Second cable 98 passes through first dogleg block 86 and attaches to second dogleg block 84. This arrangement allows extension and retraction without creating significant twisting forces.

All the embodiments disclosed in FIGS. 6-19 are limited to a maximum 2:1 fully extended to fully retracted ratio (The fully extended length is twice the fully retracted length). Even this ratio is only achievable through carefully designing the tension springs and providing recessed attachment points. Many versions will only achieve a ratio of about 1.8:1. In the event that a higher ratio is needed, still more components must be added.

Figure 20:
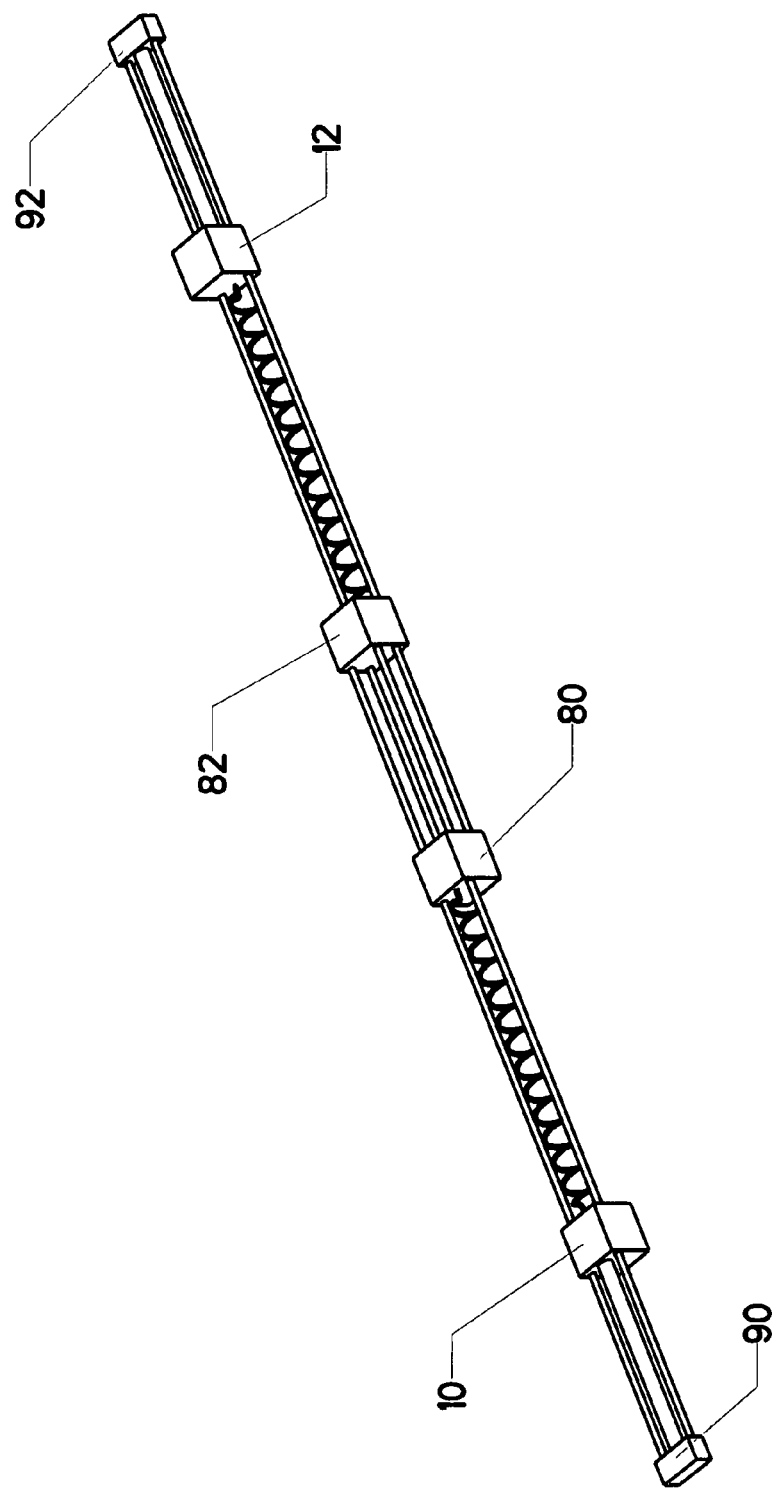
FIG. 20 is a perspective view, showing a modified version of the present invention having a greater extension length.

FIG. 20 shows an embodiment wherein two loops are linearly offset (as for the embodiment of FIG. 18). However, in this version, the cables comprising the loops actually extend through the two end blocks. First block 10 includes a pair of cable guide bores 66 allowing each first loop cable 48 to slidably pass through first block 10. Likewise, second block 12 includes a pair of cable guide bores allowing the two second loop cables 50 to pass through.

Figure 21:
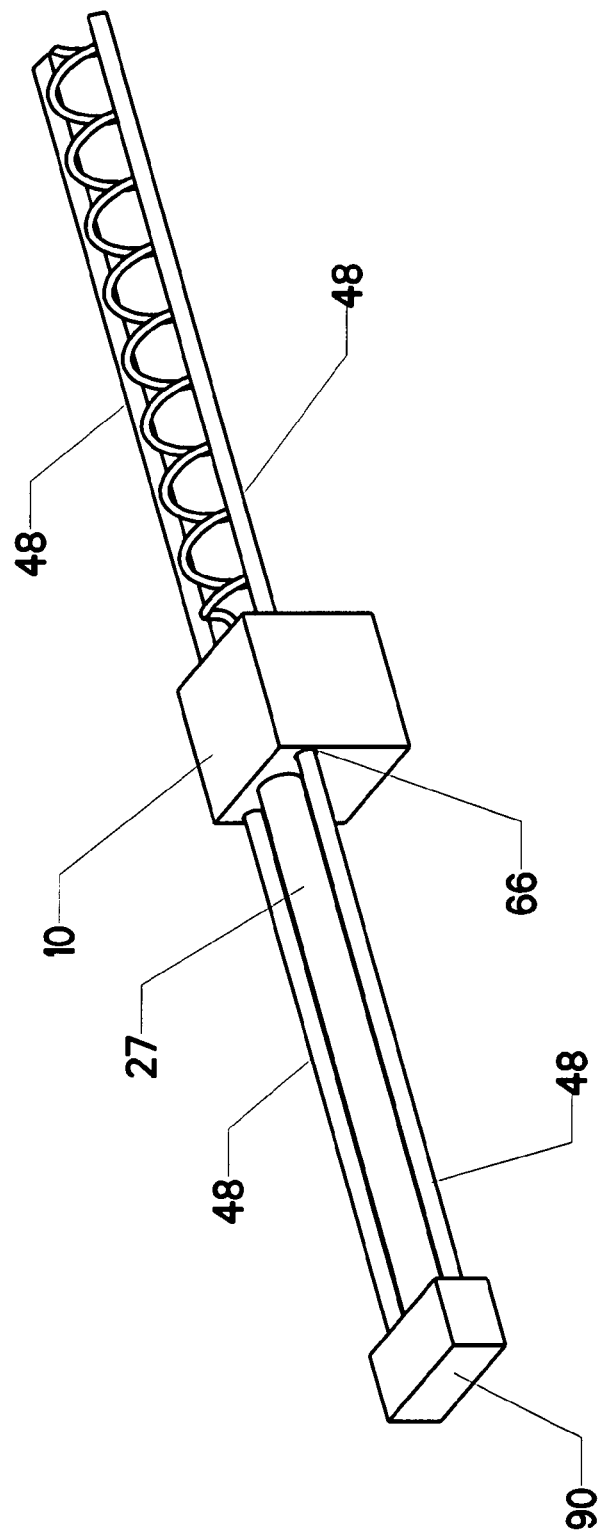
FIG. 21 is a detailed perspective view, showing some of the components of the embodiment of FIG. 20 in greater detail.

FIG. 21 shows some of the components in more detail. The two first loop cables 48 pass through cable guide bores 66 in first block 10. The two free ends of first loop cables 48 are attached to first loop end block 90. Compressive element 27 is sandwiched between first loop end block 90 and first block 10. (Likewise, the two free ends of second loop cables 50 are attached to second loop end block 92. A second compressive element 27 is sandwiched between second loop end block 92 and second block 12).

The compressive elements act as a compression spring. They may assume many forms. One example would be a compression spring resting within a hollow cylindrical sleeve. The sleeve prevents the compression spring from buckling. Another example would be a spring wound around a guide rod, with the guide rod preventing buckling.

In the embodiment of FIGS. 20 and 21, the first and second blocks can move apart until first offset block 82 bears against second offset block 80. This would customarily be the fully extended position (other than additional extension through the stretching of the cables). However, in the embodiment of FIGS. 20 and 21, the presence of the two compressive elements 27 allows further extension. The first and second blocks can move further apart until the two compressive elements 27 are compressed to their maximum extent.

Figure 22:
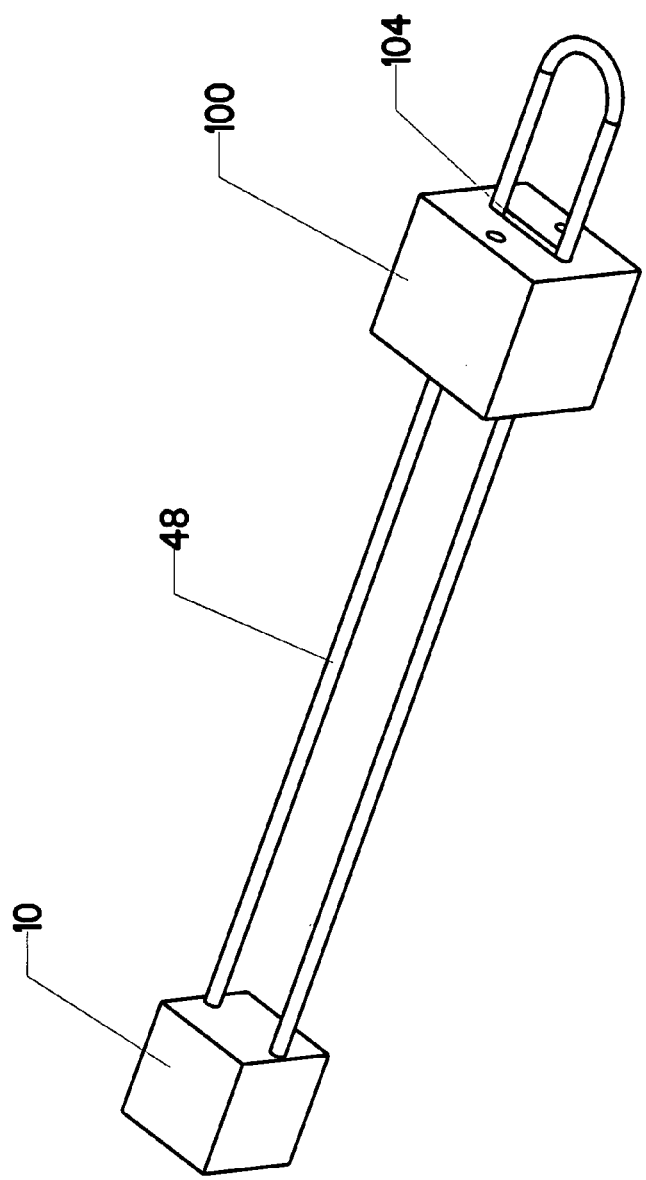
FIG. 22 is a perspective view, showing an embodiment in which a loop of cable is looped around an apex block.
Figure 23:
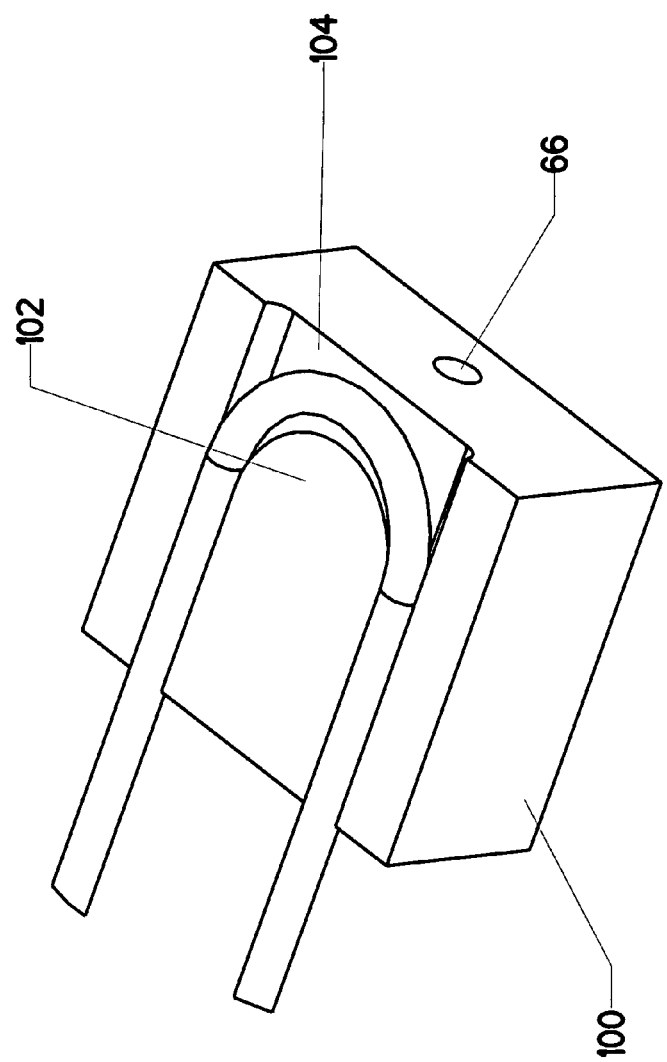
FIG. 23 is a perspective view with a cutaway, showing internal details of the apex block used in the embodiment of FIG. 22.
Figure 24:
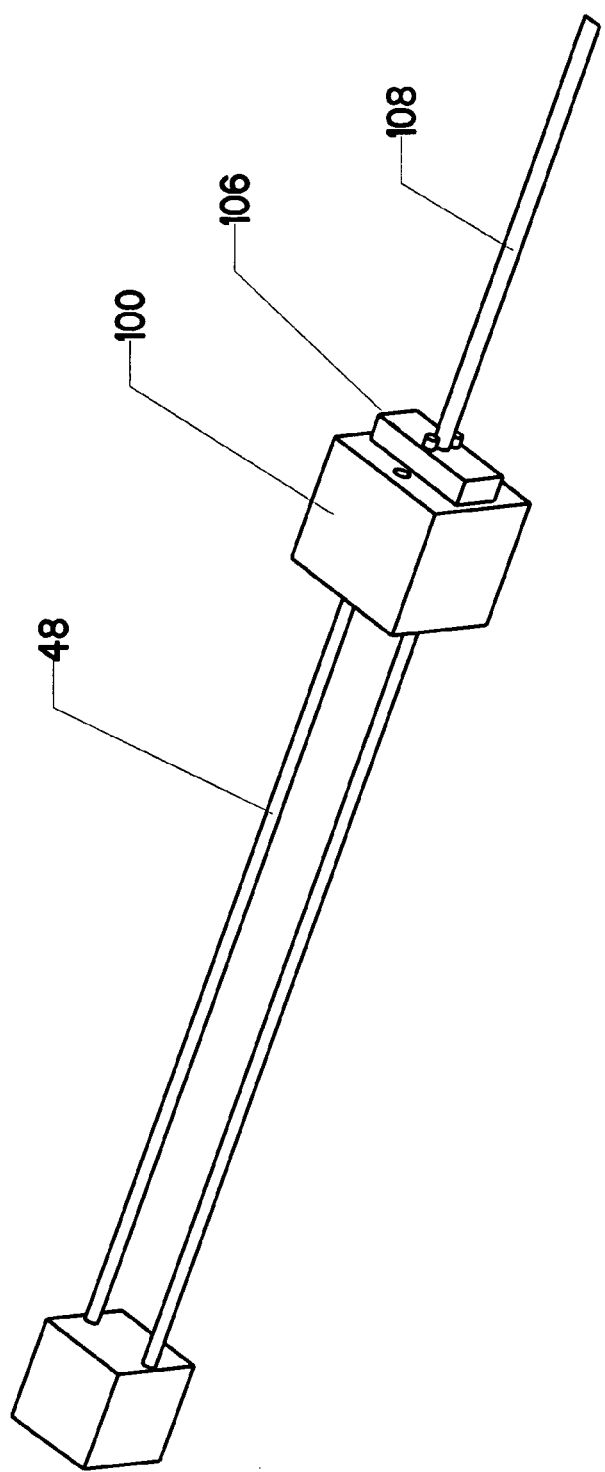
FIG. 24 is a perspective view, showing the attachment of an elastic tensile member to the apex block of FIG. 23.

As mentioned previously, there are many possible approaches to securing the cables to the apex blocks. FIGS. 22 through 24 show another example. In FIG. 22, first loop cable 48 is passed through the interior of loop apex block 100, around a securing feature, and back toward first block 10. In this embodiment, the two free ends of first loop cable 48 are attached to first block 10. FIG. 23 shows loop apex block 100 cut in half to show its internal details. The cable passes around loop retainer 102, which is given a radius large enough to prevent unduly stressing the cable. The cable can be manipulated through loop access port 104. During assembly, one end of the cable is first attached to block 10. The free end is then passed through loop apex block 100, around loop retainer 102, and back toward block 10. The free end is then attached to block 10.

Loop apex block 100 preferably contains other features disclosed in the prior embodiments, such as a pair of cable guide bores 66. The use of the loop attachment method does not change the operation of the completed assembly, which is the same as illustrated in FIGS. 16-18. However, it does introduce additional requirements as concerns the attachment of the elastic tensile member. FIG. 24 illustrates how a separate anchor block 106 can be attached to loop apex block 100. This anchor block attaches to loop apex block 100 in the vicinity of loop access port (104) (and typically covers the loop access port). Elastic tensile member 108 is attached to anchor block 106. The far end of the elastic tensile member 108 is attached to second block 12.

Elastic tensile member 108 performs the same function as tension spring 34. It is typically an extruded section of elastic material which is used to maintain tension on the assembly. Elastic straps—having a rectangular cross section—can also be used. In fact, any element capable of elastically extending and retracting while maintaining appropriate tension can be used in any of the embodiments disclosed.

The reader will thereby appreciate that all the embodiments disclosed have certain common elements and features. The elements are as follows:

1. The first and second blocks. The term "block" should be broadly understood to represent a point where extension limiting device 94 interacts with the rest of the world. The block could actually be part of an external device, such as a part of a floating dock. On the other hand, the block could be part of the extension limiting device. As an example, the block could include a hook configured to attach to an eye on a floating dock.

2. The elastic tensile members. These are the tension springs 34 in most of the embodiments disclosed. While they are shown as conventional springs, any device which can elastically expand while creating tensile forces could be used. Rubber tubing is one example.

3. The cables. The cables are tension-carrying elements which—when the device approaches its limit of extension—provide a portion of the restoring force. These will generally be selected to provide a much higher proportion of the restoring force than the elastic tensile members (near the limit of extension) but this need not always be the case.

4. The connective elements. The cables and the elastic tensile members must be linked together by at least two connective elements. In the embodiment of FIG. 7, the "connective elements" are the mechanical joints between the two loop apexes 36 and the two tension springs 34. The connective elements are more easily visualized in the embodiment of FIG. 12. The connective elements in FIG. 12 are the two stabilizing apex blocks (62 and 64).

The invention is also defined in terms of how the elements must interact with each other. Using the elements explained above, the following must be true:

1. A first block must be connected to a first connective element by a first cable;
2. A second block must be connected to a second connective element by a second cable;
3. The first block must be connected to the second connective element by a first elastic tensile member; and
4. The second block must be connected to the first connective element by a second elastic tensile member.

Most of the embodiments use pairs of cables linking the same block to the same connective element. However, the embodiment of FIG. 19 uses only a single cable for this purpose. Three, four, or more cables could be used for the purpose in other applications.

Although the preceding description contains significant detail, it should not be construed as limiting the scope of the invention but rather as providing illustrations of the preferred embodiments of the invention. Thus, the scope of the invention should be fixed by the following claims rather than the specific examples provided.

The invention claimed is:
1. A self-retracting extension limiting device, comprising:
   a. a first block;
   b. a second block;
   c. a first connective element lying between said first and second blocks;
   d. a second connective element lying between said first block and said first connective element;
   e. a first cable connecting said first block to said first connective element;
   f. a second cable connecting said second block to said second connective element;
   g. a first elastic tensile member connecting said first block to said second connective element; and
   h. a second elastic tensile member connecting said second block to said first connective element.

2. A self-retracting extension limiting device as recited in claim 1, wherein:
   a. said first connective element is a first apex block; and
   b. said second connective element is a second apex block.

3. A self-retracting extension limiting device as recited in claim 1, wherein:
   a. said first elastic tensile member is a first tension spring; and
   b. said second elastic tensile member is a second tension spring.

4. A self-retracting extension limiting device as recited in claim 2, wherein:
   a. said first elastic tensile member is a first tension spring; and
   b. said second elastic tensile member is a second tension spring.

5. A self-retracting extension limiting device as recited in claim 2, wherein:
   a. said first apex block includes a first cable guide bore;
   b. said second apex block includes a second cable guide bore;
   c. said first cable passes through said second cable guide bore in said second apex block; and
   d. said second cable passes through said first cable guide bore in said first apex block.

6. A self-retracting extension limiting device as recited in claim 2, further comprising:
   a. a third cable connecting said first block to said first apex block;
   b. a fourth cable connecting said second block to said second apex block;
   c. wherein said first elastic tensile member is parallel to said first and third cables and lies therebetween; and
   d. wherein said second elastic tensile member is parallel to said second and fourth cables and lies therebetween.

7. A self-retracting extension limiting device as recited in claim 6, wherein:
   a. said first apex block includes a first cable guide bore and a second cable guide bore;
   b. said second apex block includes a third cable guide bore and a fourth cable guide bore;
   c. said first cable passes through said third cable guide bore;
   d. said third cable passes through said fourth cable guide bore;
   e. said second cable passes through said first cable guide bore; and
   f. said fourth cable passes through said second cable guide bore.

8. A self-retracting extension limiting device as recited in claim 7, wherein:
   a. said third cable guide bore is a sliding fit on said first cable;
   b. said fourth cable guide bore is a sliding fit on said third cable;
   c. said first cable guide bore is a sliding fit on said second cable; and
   d. said second cable guide bore is a sliding fit on said fourth cable.

9. A self-retracting extension limiting device as recited in claim 5, wherein:
   a. said first elastic tensile member is a first tension spring; and
   b. said second elastic tensile member is a second tension spring.

10. A self-retracting extension limiting device as recited in claim 6, wherein:
    a. said first elastic tensile member is a first tension spring; and
    b. said second elastic tensile member is a second tension spring.

11. A self-retracting extension limiting device as recited in claim 7, wherein:
   a. said first elastic tensile member is a first tension spring; and
   b. said second elastic tensile member is a second tension spring.

12. A self-retracting extension limiting device as recited in claim 8, wherein:
   a. said first elastic tensile member is a first tension spring; and
   b. said second elastic tensile member is a second tension spring.

\* \* \* \* \*